United States Patent [19]
Ellis et al.

[11] 3,875,251
[45] Apr. 1, 1975

[54] 2-(1-PROPENYL-5-NORBORNENE SEPARATION FROM PIPERYLENE DIMERS BY COMPLEXING WITH COPPER, SILVER, GOLD OR MERCURY COMPOUND

[75] Inventors: James Morgan Hunter Ellis; Paul Hepworth; Pannalal Sohanlal Jhawar, all of Stockton-on-Tees, England

[73] Assignee: Imperial Chemical Industries Ltd., London, England

[22] Filed: Feb. 19, 1974

[21] Appl. No.: 443,769

[30] Foreign Application Priority Data
Feb. 21, 1973 United Kingdom............. 8492/73

[52] U.S. Cl.................... 260/666 PY, 260/681.5 C

[51] Int. Cl............................................ C07c 13/28
[58] Field of Search...260/666 PY, 681.5 R, 681.5 C

[56] References Cited
UNITED STATES PATENTS

| | | | |
|---|---|---|---|
| 3,206,521 | 9/1965 | Long............................ | 260/681.5 C |
| 3,403,196 | 9/1968 | Long et al.................... | 260/681.5 C |
| 3,427,360 | 2/1969 | Makowski.................... | 260/666 PY |

*Primary Examiner*—Veronica O'Keefe
*Attorney, Agent, or Firm*—Cushman, Darby & Cushman

[57] ABSTRACT 2-(1-propenyl)-5-norbornene is separated from piperylene dimers by complex formation with a compound of copper, silver, gold or mercury.

8 Claims, No Drawings

2-(1-PROPENYL-5-NORBORNENE SEPARATION FROM PIPERYLENE DIMERS BY COMPLEXING WITH COPPER, SILVER, GOLD OR MERCURY COMPOUND

The present invention relates to a separation process, in particular to the separation of 2-(1-propenyl)-5-norbornene from piperylene dimers.

2-(1-propenyl)-5-norbornene (PNB) is a bridged ring compound of structure

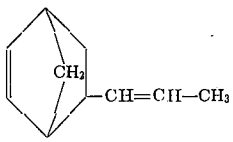

(b.pt. 169°C at 1 at.)
and is a useful termonomer in co-called EPDM rubbers in which it is copolymerised with ethylene and propylene. The synthesis of PNB involves the condensation of piperylene with cyclopentadiene and as well as the desired product there are obtained coproduct dicyclopentadiene (DCPD) and piperylene dimers boiling in the range 140° to 180°C. (There are some 16 isomeric piperylene dimers, the principle isomers being

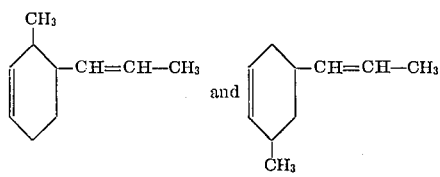

The separation of the PNB and piperylene dimers may be carried out by distillation but it involves a considerable capital outlay in a number of multiplate distillation columns. The present invention replaces at least some of the distillation stages by an extraction process and in so doing reduces the cost of production of PNB.

Accordingly the invention is a process for the separation of 2-(1-propenyl)-5-norbornene from a mixture containing 2-(1-propenyl)-5-norbornene and piperylene dimers in which
 a. the mixture is contacted with a compound of copper, silver, gold or mercury so as to form a complex between the 2-(1-propenyl)-5-norbornene and the metal compound,
 b. the complex is separated from the piperylene dimers and,
 c. the complex is decomposed to recover 2-(1-propenyl)-5-norbornene.

The compound of copper, silver, gold or mercury which is used in the process is preferably a simple salt such as a halide, e.g. chloride, a carboxylate e.g. derived from a $C_1$ to $C_6$ alkanoic acid or a nitrate. Copper is the preferred metal and cuprous chloride has proved to be a suitable complex forming compound.

The metal compound may be used in solution, particularly in aqueous solution which forms a two phase system with the hydrocarbon mixture being extracted. The PNB/metal compound complex passes into the aqueous phase and the PNB is recovered therefrom by suitable means such as by heating, e.g. with steam, up to 200°C if necessary under pressure. Alternatively the metal compound may be used in solid form in which case the hydrocarbon mixture being extracted is slurried with the solid metal compound, the complex when it is formed also being a solid and being capable of separation from the uncomplexed hydrocarbon by filtration, decantation etc.

The conditions under which the metal compound is contacted with the PNB/piperylene dimers mixture varies depending on the metal compound to be used. Both PNB and piperylene dimers are capable of forming complexes with the metal compound but we have found that the complexes have different stabilities. Piperylene dimers form less stable complexes than does PNB so the conditions should be chosen such that the PNB complex is stable whereas the piperylene dimers complex is not. For example, if cuprous chloride is the complexing agent the complex should be formed at 20° to 50°C. For other metal compounds this temperature may differ although for practical purposes a metal compound should be chosen which can be used in the range $-100°$ to $+100°C$.

The concentration of metal compound used should preferably be such as to provide one mole per mole of PNB to be extracted. If desired a diluent may be added to the hydrocarbon mixture to facilitate the extraction although in many cases the volume of uncomplexed piperylene dimers provides sufficient diluent. If a diluent is used it may suitably be a hydrocarbon particularly a paraffin. The exact diluent may be chosen by reference to the temperature required for the formation of the complex. For instance if the complex is to be formed at 30° to 40°C then a 30/40 petroleum ether (comprising predominantly pentanes) may be used and allowed to reflux during the exothermic complex formation so maintaining the desired temperature. If higher temperatures are required then a higher boiling diluent, e.g. a heptane mixture may be used. The metal compound should be agitated with the PNB/piperylene dimers mixture so as to provide as effective contact as possible between the PNB and the metal compound.

The separation of the metal complex from the piperylene dimers is made by a phase separation either liquid from liquid or solid from liquid. If desired the separated complex either in solid form or in solution may be purified by washing with a solvent such as an alkane to remove final traces of piperylene dimers.

The complex is preferably decomposed by heating at an elevated temperature, e.g. up to 250°C, when the PNB is released. The complex may be heated as a solid or in solution or in suspension in a high boiling diluent.

The process of the present invention is particularly suitable for combination with the process described in our British Pat. No. 1,297,081 (U.S. Application Ser. No. 136,547). The latter process involves the production of a mixture of olefines containing PNB by:
 a. distilling a pyrolysis gasoline fraction derived from a cracked hydrocarbon feedstock to produce a distillate boiling in the range 10° to 80°C and comprising piperylene and isoprene,
 b. redistilling this distillate to produce an "isoprene concentrate" and a "piperylene concentrate," and
 c. heating the "piperylene concentrate" at a temperature in the range 120° to 250°C to produce a mixture containing predominantly PNB, DCPD and piperylene dimers, but also including some unchanged $C_5$ hydrocarbons and higher polymers of CPD, i.e. hydrocarbons containing 15 carbon atoms.

The isoprene concentrate produced in the process of British Pat. No. 1,297,081 suitably boils in the range 10° to 40°C and comprises isoprene and the lower boiling hydrocarbons of the fraction boiling in the range 10° to 80°C while the "piperylene concentrate" comprises piperylene and the higher boiling hydrocarbons of this fraction.

The product from stage (c) may, if desired, be used as a termonomer after removing the $C_5$ and $C_{15}$ hydrocarbons, i.e. as a mixture of PNB (50 wt.%) piperylene dimers and DCPD. Alternatively and preferably some further refinement of the mixture is carried out to increase its PNB content and to reduce its piperylene dimers content. To carry out this refinement by distillation involves the use of at least three more distillation columns after the first distillation in which the $C_5$ hydrocarbons are removed. The use of the process of the present invention enables a reduction to be made in this number and in particular it eliminates the distillation stages requiring the largest number of plates.

Thus the mixture from stage (c) of the process described in British Pat. No. 1,297,081 may be initially subjected to a distillation step in which unreacted $C_5$ hydrocarbons are removed as a distillate boiling up to 80°C. The residue from the distillation may be then submitted to the process of the present invention, e.g. by agitation with solid cuprous chloride at 20° to 50°C. The complex formed may be removed and decomposed as described earlier in this specification. Alternatively, the residue remaining after the $C_5$ removal may be subjected to a second distillation in which $C_{15}$ hydrocarbons are removed as residue and the PNB, piperylene dimers and DCPD as distillate (boiling at 140° to 190°C). This distillate is then treated by the process according to the present invention by means of which some DCPD is removed as well as the piperylene dimers.

The invention will now be further described by reference to the following examples.

EXAMPLE 1

A mixture comprising 80 wt.% PNB, 15 wt.% piperylene dimers and 5 wt.% DCPD was produced by the process described and claimed in British Pat. No. 1,297,081

150 mls. of 30/40 petroleum ether were mixed with 150 grams of solid cuprous chloride and 150 grams of the PNB/piperylene dimers/DCPD mixture slowly added with stirring to maintain the mixture under reflux. After 30 minutes when reaction ceased the complex was filtered from the solution, washed with 30/40 petroleum ether and dried under vacuum.

The complex was finally decomposed by heating at 100° to 150°C to produce a mixture containing 98 wt.% PNB and no piperylene dimers.

EXAMPLES 2 (1-15)

The following examples were carried out using the basic technique described in Example 1. Individual variations are noted in the following Table of results. In each case the complex was decomposed by heating at 126°C. 2% based on the weight of hydrocarbon feed of methanol was added to facilitate the complex formation. This effect could equally as well have been achieved with any lower ($C_1$ to $C_6$) alkanol.

| Example No. | Feed Composition* % | | | Pet ether 30/40 | CuClg | Wt. % feed g | Product Composition % | | |
|---|---|---|---|---|---|---|---|---|---|
| | PNB | PIP Dimers | DCPD | | | | PNB | PIP Dimers | DCPD |
| 1 | 77.1 | 18.4 | 4.4 | —⁺ | 30 | 30 | 92.3 | 5.1 | 2.6 |
| 2 | 88.5 | 7.7 | 3.7 | 35 | 30 | 31 | 96.6 | 11.4 | 2.0 |
| 3 | 75.9 | 18.1 | 6.0 | 5 | 10 | 5.4 | 89.7 | 2.5 | 5.9 |
| 4 | 54.2 | 20.4 | 25.4 | 5 | 10 | 5 | 97.8 | — | 2.2 |
| 5 | 88.5 | 7.7 | 3.7 | 30 | 60 | 30 | 93.4 | 2.7 | 3.4 |
| 6 | 88.5 | 7.7 | 3.7 | —⁺ | 28.4 | 30 | 94.9 | 1.6 | 3.2 |
| 7 | 77.1 | 18.4 | 4.4 | 150 | 150 | 150 | 97.7 | — | 1.5 |
| 8** | 77.1 | 16.5 | 6.3 | 150 | 150 | 150 | 97.2 | — | 2.6 |
| 9** | 78.1 | 15.7 | 6.0 | — | * | 150 | 92.9 | 3.3 | 3.7 |
| 10** | 77.8 | 16.6 | 5.5 | — | * | 100 | 91.5 | 3.9 | 4.3 |
| 11 | 84.7 | 15.4 | 5.7 | 750 | 750 | 750 | 98.0 | 1.6 | 0.4 |
| 12 | 84.7 | 15.4 | 5.7 | 1000 | 1000 | 1000 | 92.7 | 5.3 | 2.0 |
| 13 | 84.7 | 15.4 | 5.7 | 10000 | 1000 | 1000 | 95.5 | 3.1 | 1.4 |
| 14 | 69.5 | 7.5 | 23 | 750 | 750 | 876 | 89 | 4.5 | 6.5 |
| 15 | 62.8 | 29.2 | 7.8 | 750 | 750 | 1052 | 97.1 | 2.0 | 0.9 |

**The complex was slurried in silicone oil for decomposition
*The CuCl was reused from the previous experiment
⁺Solid CuCl added to the hydrocarbon

We claim:
1. In a process for the separation of 2-(1-propenyl)-5-norbornene from a mixture containing 2-(1-propenyl)-5-norbornene and piperylene dimers as hereinbefore defined the steps of
    a. contacting the mixture with a compound of a metal selected from the group consisting of copper, silver, gold and mercury so as to form a complex between the 2-(1-propenyl)-5-norbornene and the metal compound.
    b. separating said complex from the piperylene dimers and,
    c. decomposing said complex to recover 2-(1-propenyl)-5-norbornene.
2. The process of claim 1 in which said compound of said metal is a halide, a carboxylate or a nitrate.
3. The process of claim 1 in which the temperature in step (a) is −100° to +100°C.
4. The process of claim 3 in which the metal compound is cuprous chloride and the temperature 20° to 50°C.
5. The process of claim 1 in which the concentration of said metal compound in step (a) is such as to provide about one mole for each mole of 2-(1-propenyl)-5-norbornene in the mixture.

6. The process of claim 1 in which a diluent is added to the mixture in step (a).

7. The process of claim 1 in which the complex is decomposed in step (c) by heating at an elevated temperature.

8. The process of claim 1 in which said mixture is contacted with an aqueous solution of cuprous chloride, copper nitrate or the copper salt of a $C_1$ to $C_6$ alkanoic acid at 20° to 50°C and in a concentration of about 1 mole copper salt for each mole of 2-(1-propenyl)-5-norbornene in the mixture and the aqueous solution of the complex is separated from the residual organic phase and the aqueous solution heated at a temperature up to 250°C to recover said 2-(1-propenyl-5-norbornene.

* * * * *